Figure 1:
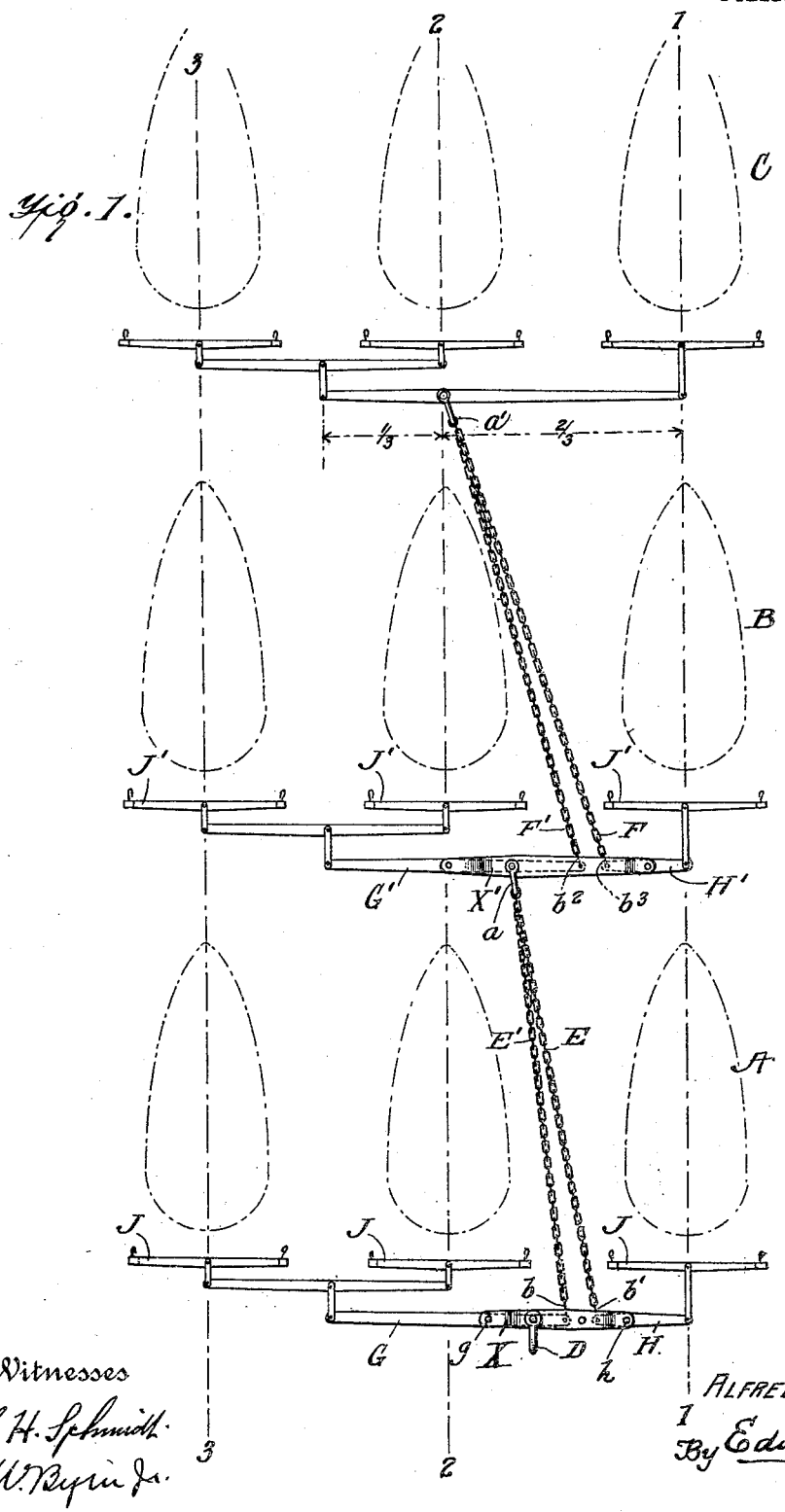

A. HINES.
DRAFT EQUALIZER.
APPLICATION FILED MAR. 16, 1909.

931,925.

Patented Aug. 24, 1909.
2 SHEETS—SHEET 1.

Witnesses
L. H. Schmidt.
C. W. Byrn Jr.

Inventor
ALFRED HINES,
By Edw. W. Byrn.
Attorney

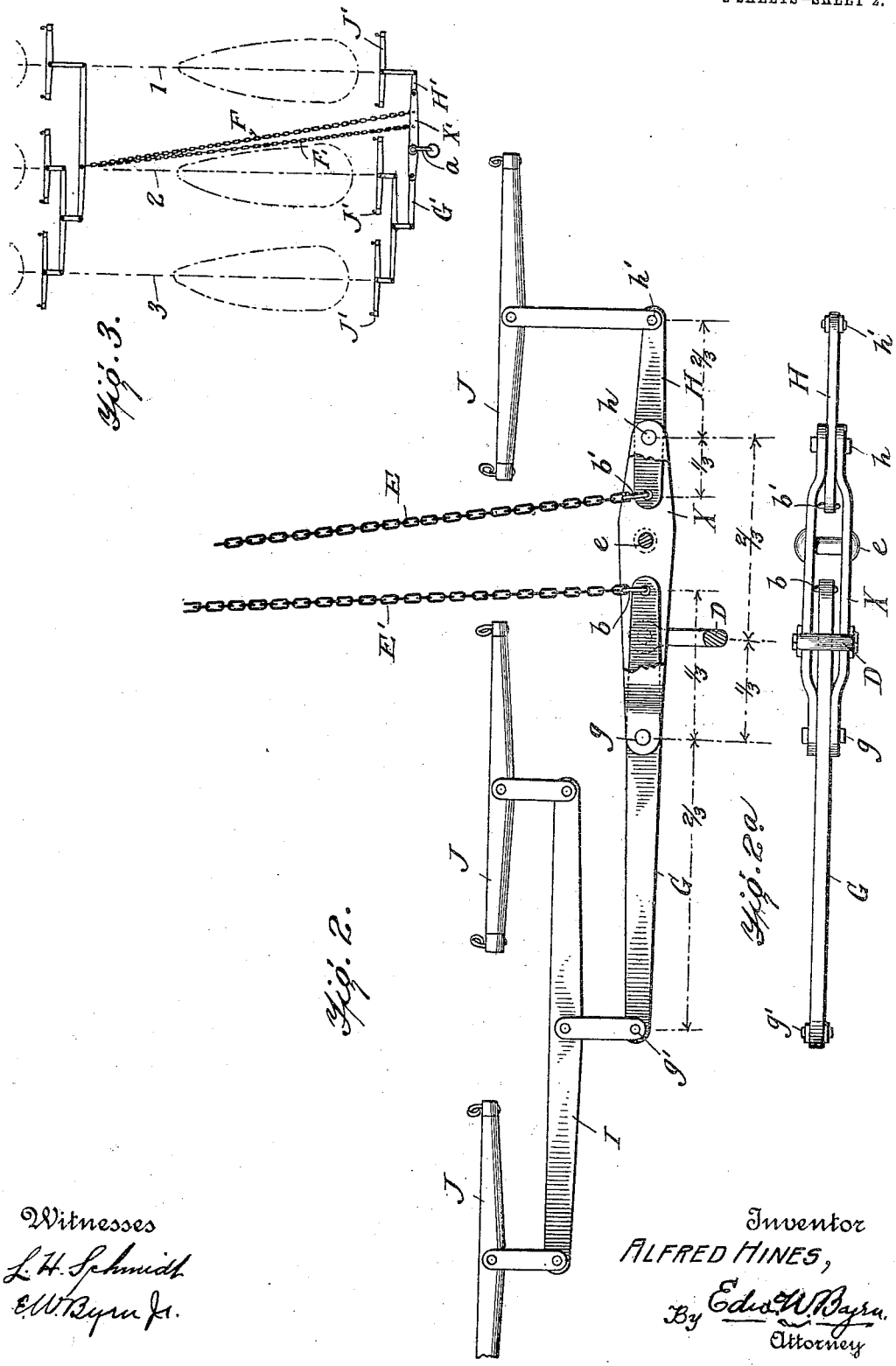

UNITED STATES PATENT OFFICE.

ALFRED HINES, OF WASCO, OREGON.

DRAFT-EQUALIZER.

931,925.  Specification of Letters Patent.  Patented Aug. 24, 1909.

Application filed March 16, 1909. Serial No. 483,759.

*To all whom it may concern:*

Be it known that I, ALFRED HINES, a citizen of the United States, residing at Wasco, in the county of Sherman and State of Oregon, have invented certain new and useful Improvements in Draft-Equalizers, of which the following is a specification.

My invention relates to that form of draft attachments which are employed for hitching the team in groups to the plows or other implements or machines to be drawn, and it especially relates to groups of three. It has been common in this triple grouping to arrange three draft animals abreast, with the swingletrees of the three animals connected to an evener bar in such relation to its rear draft point as to divide the evener bar into thirds, the short end of the evener bar being connected to two swingletrees in front of it and the long end to the other one of the three swingletrees abreast. My invention employs this old arrangement, but provides in addition such further construction and arrangement of the parts as to permit the horses in a plurality of groups of three abreast to be so arranged that the center of each group shall be in the center draft line of all the other groups and yet the flexible draft cable connecting the groups shall stand at an angle to the draft line so as to connect a rear group at one side of its center with the middle of the group in front, thereby leaving a sufficient space for the two horses of any group on one side of the connecting cable chain without being chafed thereby and yet preserving the center of each group in the same draft alinement and thus allowing the horses to walk straight in the furrow, each horse of each group being exactly in line with the corresponding horses of the other groups.

Figure 1 is a plan view of the equalizer arranged for a gang of nine horses disposed in groups of three abreast in accordance with my invention. Fig. 2 is an enlarged plan view partly broken away of the connections of the rear group. Fig. 2ª is a rear edge view of the middle part of the same and, Fig. 3 is a plan view on a smaller scale showing my invention as applied to six horses.

In the drawing, Fig. 1, A, B, C, represent three groups of draft animals of three abreast connected up by my draft equalizer in accordance with my invention. D is the rear main draft attachment which connects with the plows, or other implements or machines to be drawn, and which draft attachment bears the entire strain of the whole team.

Of the three groups, the two rear ones A and B necessarily involve my invention, but the front one C may or may not; that is to say, this group C may have any desired number of horses so long as the center of the group is in line with the center of the rear groups.

I will now proceed to describe and point out the distinctive features of my invention. It will be perceived, in the first place, that the draft cables E, $E^1$ and F, $F^1$, which connect the groups, are duplex cable chains which have a single point of connection near the middle of the group in front as at $a$ and $a^1$ and two independent points of connection at the rear as at $b$—$b^1$ and $b^2$ $b^3$. This in itself is old, as shown for instance in the expired patent No. 253,071, Jan. 31, 1882, but it will be further noticed that the group-connecting cables E—$E^1$ and F—$F^1$ are not parallel to the line of draft, but stand at a considerable angle thereto. Thus the dotted lines 1, 2, 3 represent the parallel lines of draft, in which it will be seen that each middle horse stands exactly in the center line 2 of draft, and each outside horse on one side stands in the same draft line 1, and each outside horse on the other side stands in the same draft line 3. The angular position of the group-connecting cables E—$E^1$ and F—$F^1$ to the line of draft is specially related to my invention and is a distinctive feature of the same, which I will now describe.

Referring to Fig. 2, which represents the draft connections of the rear group of three horses next to the plow, X represents a truss frame composed of two members slightly bowed away from each other as seen in Fig. 2ª, one above the other. The two members are rigidly connected by a bolt $e$ and are spaced apart a sufficient distance to allow the two levers G and H to play between them. The lever G is fulcrumed upon a bolt $g$ which also connects the outer ends of the two members of the truss X and the lever H is fulcrumed upon a bolt $h$, which also connects the outer ends of the truss members on the other side. The main draft connection D is a clevis whose arms embrace and are pivotally connected to the upper and lower members of the truss X at a point one third of its length from the left hand end. The inner end of lever G from its fulcrum $g$ to its hitching hook $b$ is half as long as the outer portion from fulcrum $g$ to the outer end $g^1$, so as to divide the lever into thirds. At the outer end $g^1$ of the lever G is hitched a double tree I to which are connected two swingle-trees J—J. The lever H is also divided about its fulcrum $h$ into thirds, so that the inner end from fulcrum $h$ to hitching hook $b^1$ is one half of the length from the fulcrum $h$ to the outer end $h^1$. To this outer end is attached a swingle-tree J. To the two juxtaposed hooks $b$—$b^1$ are attached the double cable chains E—$E^1$, which extend forward to and connect with a single ring $a$ of the next draft connection in front, as seen in Fig. 1. This next draft connection in front, shown at $X^1$, $G^1$, $H^1$, is constructed and arranged the same as the one just described, except that the levers $G^1$ and $H^1$ are fulcrumed in their middle lines so at to divide them into halves. The rear draft connection $a$ of this group of the team, to which the forward end of the cables E—$E^1$ are attached, it will be seen is near the middle line of the center horse, while the rear ends of the cables E—$E^1$, as at $b$—$b^1$, are offset to one side of the main draft clevis D. This causes the general direction of the cables E—$E^1$ to be at an angle to the center draft line 2—2. This gives more room for the double team on the left hand side and still allows the horses in the three groups to stand in parallel lines, with the middle horse in each group in line with the middle horse of the other groups and the outside horses of each group also in parallel alinement. This also enables the horses of the several groups to stand in a line in the furrow.

The middle draft equalizer has its two cable chains F—$F^1$ also extending in angular relation to the lines of draft and at their forward ends are connected in a single ring to an equalizer divided into thirds for three horses as shown, or any other grouping, there being no cable chain extending forward of this group.

It will be seen from the foregoing that my invention as thus described provides for a team of nine horses arranged in groups of three abreast, that the double-tree of each group is on the same side of the cable chains, that each horse of each group walks in the line of draft of the corresponding horse of each of the other groups and that the cable chain stands at an angle to the line of draft, giving a wider space at the rear end of the cable chains for the double teams and that the draft connections D and $a$ are on one side of the cable chains E—$E^1$ and F—$F^1$ and on the same side in relation to each other.

Although it might appear that the two front groups of teams would have a tendency to drift sidewise and straighten out the draft cables to parallelism with the line of advance, yet this in practice does not occur, for a combination of reasons. First, because the instinct and education of the draft animals cause them to walk straight in the furrow, even if the line of the draft strain is not exactly coincident with the line of advance. Second, because in practice the angular variation is slight and there is but little side strain, and thirdly, because any tendency to drift sidewise is distributed through the three horses and is not concentrated on any one of the group sufficiently to disturb his proper line of travel.

In modifying my invention, the front group C of the team may be changed in numbers but still preserving the three groups. If desired also the rear group A may be omitted and the groups B and C alone may be employed forming a team of six as seen in Fig. 3, in which it will be perceived that the same angular relation of the draft cables to the line of draft exists, the horses all walk in alinement and the double-trees are all on the same side of the draft cable.

I claim.

1. A draft equalizer for a plurality of groups of animals, comprising a rear equalizer consisting of a truss having upper and lower members, two levers fulcrumed respectively between the ends of the upper and lower members of the truss and having their inner adjacent ends between the truss members provided with cable connections, a main rear draft connection pivotally attached to the truss one third the distance of its length from one end, a double tree with two swingle-trees connected to the outer end of one lever, a swingle-tree connected to the outer end of the other lever, two cables connected respectively to the inner ends of the two levers and extending forwardly at an angle to the line of draft and having a draft attachment for a plurality of animals connected to its forward end.

2. A draft equalizer for a plurality of groups of animals, comprising a rear equalizer consisting of a truss having upper and lower members, two levers fulcrumed respectively between the ends of the upper and lower members of the truss and having their inner adjacent ends between the truss members provided with cable connections, a main rear draft connection pivotally attached to the truss one third the distance of its length from one end, a double tree with two swingle-trees connected to the outer end of one lever, a swingle-tree connected to the outer end of the other lever, two cables connected respectively to the inner ends of the two levers and extending forwardly at an angle to the line of draft and having a draft attachment for a plurality of animals connected to its forward end, said draft attachment consisting of a draft equalizer connected to the cable at a point one third the distance from the end and having a double-tree with two swingle-trees on one end and one swingle-tree on the other end, the double-trees of both front and rear equalizers being on the same side of the cable connection for the two equalizers, to bring the animals of the double-tree of one equalizer in the line of draft with the animals of the double-tree of the other equalizer and the animals of the swingle-trees of the two equalizers in similar relation.

3. A draft equalizer for three groups of animals, comprising a rear equalizer consisting of a truss having upper and lower members, two levers of unequal length fulcrumed respectively between the ends of the upper and lower members of the truss at points representing one third of the length of said levers and having their inner adjacent ends between the truss members provided with cable connections, a main draft connection pivotally attached to the rear truss one third the distance of its length from the end, a double-tree with two swingle-trees connected to the outer end of the longer lever, a swingle-tree connected to the outer end of the shorter lever, two cables connected respectively to the inner ends of the two levers of the rear equalizer and extending forward at an angle to the line of draft, a second equalizer in front having a truss with a draft connection one third the distance from its end attached to the forward end of the said cable chains, two levers for said second equalizer fulcrumed at their middle points to the ends of said last named truss and having cable connections on their inner ends, a double-tree with two swingle-trees connected to one end of one lever, a swingle-tree attached to the end of the other lever, two cables connected to the inner ends of the last named levers and extending forwardly at an angle to the line of draft, and a third front team connection attached to the forward ends of said last named cables.

4. A draft equalizer for three groups of animals, comprising a rear equalizer consisting of a truss having upper and lower members, two levers of unequal length fulcrumed respectively between the ends of the upper and lower members of the truss at points representing one third of the length of said levers and having their inner adjacent ends between the truss members provided with cable connections, a main draft connection pivotally attached to the rear truss one third the distance of its length from the end, a double-tree with two swingle-trees connected to the outer end of the longer lever, a swingle-tree connected to the outer end of the shorter lever, two cables connected respectively to the inner ends of the two levers of the rear equalizer and extending forwardly at an angle to the line of draft, a second equalizer in front having a truss with a draft connection one third the distance from its ends attached to the forward end of the said cable chains, two levers for said second equalizer fulcrumed at their middle points to the ends of said last named truss and having cable connections on their inner ends, a double-tree with two swingle-trees connected to one end of one lever, a swingle-tree attached to the end of the other lever, two cables connected to the inner ends of the last named levers and extending forwardly at an angle to the line of draft, and a third front team connection attached to the forward ends of said last named cables, said front team connection consisting of an equalizer bar fulcrumed one third the distance from its ends on the forward ends of the front draft cables and having a double team connection on the short end and a single team connection on the long end to form a nine team gang with the double teams of each equalizer in line with the double team of all the other equalizers and the single teams of each equalizer in line with the single teams of all the other equalizers.

In testimony whereof I hereunto affix my signature in presence of two witnesses.

ALFRED HINES.

Witnesses:
E. W. BYRN, Jr.,
N. R. GRIMM.